(12) United States Patent
Basile

(10) Patent No.: US 7,788,504 B2
(45) Date of Patent: Aug. 31, 2010

(54) COPY PROTECTION OF OPTICAL DISCS

(75) Inventor: Carmen Laura Basile, Maidenhead (GB)

(73) Assignee: Rovi Solutions Corporation, Santa Clara, CA (US)

( * ) Notice: Subject to any disclaimer, the term of this patent is extended or adjusted under 35 U.S.C. 154(b) by 1220 days.

(21) Appl. No.: 11/132,896

(22) Filed: May 19, 2005

(65) Prior Publication Data

US 2005/0270190 A1 Dec. 8, 2005

(30) Foreign Application Priority Data

May 19, 2004 (GB) ................... 0411163.9

(51) Int. Cl.
*H03M 5/00* (2006.01)
(52) U.S. Cl. .............. 713/193; 341/58; 369/59.23; 380/203; 726/26; 726/31; 726/32; 726/33
(58) Field of Classification Search ............ 341/58–59; 369/59.23, 59.24; 380/201, 203; 386/14–15, 386/82, 94, 125–126; 713/189, 193; 726/26, 726/31–33
See application file for complete search history.

(56) References Cited

U.S. PATENT DOCUMENTS

| 4,603,413 | A |   | 7/1986  | Sinjou et al. |
| 5,659,613 | A |   | 8/1997  | Copeland et al. |
| 5,696,505 | A |   | 12/1997 | Immink |
| 5,699,434 | A |   | 12/1997 | Hogan |
| 5,703,858 | A |   | 12/1997 | Mitchell et al. |
| 5,748,119 | A |   | 5/1998  | Ko |
| 5,787,068 | A |   | 7/1998  | Arps |
| 5,828,754 | A |   | 10/1998 | Hogan |
| 5,832,088 | A |   | 11/1998 | Nakajima et al. |
| 6,011,496 | A | * | 1/2000  | Park et al. ................ 341/55 |
| 6,028,936 | A |   | 2/2000  | Hillis |

(Continued)

FOREIGN PATENT DOCUMENTS

EP    0 347 934 A2    12/1989

(Continued)

OTHER PUBLICATIONS

Machine Translation of JP 2003303468.*

(Continued)

*Primary Examiner*—Kimyen Vu
*Assistant Examiner*—Darren Schwartz
(74) *Attorney, Agent, or Firm*—Victor H. Okumoto; Andy T. Pho

(57) ABSTRACT

Subversive DSV (SDSV) sequences of data symbols having a large absolute value of DSV are extremely valuable in the copy protection of optical discs as they can induce uncorrectable read errors. However, very few SDSV sequences of data symbols can be found in multimodal codes such as Eight-to-Sixteen Modulation (ESM) utilised in DVDs. It is required to select data symbols, for encoding using a multimodal code, which are capable of forcing an encoder to produce at least one subversive sequence of code words. A possible code word for a data symbol is selected if the code word has a large absolute value of DSV and there are no alternative code words, or all alternative code words are equivalent, or all alternatives except one are ruled out by RLL rules.

6 Claims, 15 Drawing Sheets

U.S. PATENT DOCUMENTS

| | | | |
|---|---|---|---|
| 6,076,165 | A | 6/2000 | Maenza |
| 6,278,386 | B1 | 8/2001 | Hogan |
| 6,317,397 | B1 * | 11/2001 | Deguchi et al. ......... 369/47.19 |
| 6,353,890 | B1 | 3/2002 | Newman |
| 6,421,750 | B1 | 7/2002 | Gunther et al. |
| 6,665,240 | B1 | 12/2003 | Kobayashi et al. |
| 6,694,023 | B1 | 2/2004 | Kim |
| 6,782,190 | B1 | 8/2004 | Morito |
| 6,839,312 | B2 | 1/2005 | Heylen et al. |
| 6,966,002 | B1 | 11/2005 | Torrubia-Saez |
| 7,030,788 | B2 | 4/2006 | Aida et al. |
| 7,366,071 | B2 * | 4/2008 | Kihara et al. ............ 369/53.21 |
| 2001/0011237 | A1 | 8/2001 | Tanaka et al. |
| 2002/0076046 | A1 * | 6/2002 | Heylen ....................... 380/203 |
| 2003/0184455 | A1 * | 10/2003 | Hayami ....................... 341/59 |
| 2003/0227398 | A1 * | 12/2003 | Chen et al. ................... 341/59 |
| 2004/0037201 | A1 | 2/2004 | Sako et al. |
| 2004/0062168 | A1 * | 4/2004 | Kobari et al. ............ 369/59.24 |
| 2004/0151105 | A1 | 8/2004 | Aida et al. |
| 2005/0163315 | A1 | 7/2005 | Jackson et al. |
| 2005/0193313 | A1 | 9/2005 | Heylen et al. |
| 2005/0226412 | A1 | 10/2005 | Selve et al. |

FOREIGN PATENT DOCUMENTS

| | | |
|---|---|---|
| EP | 0 347 934 A3 | 12/1989 |
| EP | 0 347 934 B1 | 12/1989 |
| EP | 0 791 923 A2 | 8/1997 |
| EP | 0918326 A1 * | 10/1997 |
| EP | 0 854 482 A1 | 7/1998 |
| EP | 0 854 482 B1 | 7/1998 |
| EP | 0 918 326 A1 | 5/1999 |
| EP | 1 011 103 A1 | 6/2000 |
| EP | 1 355 306 A1 | 10/2003 |
| EP | 1 396 857 A1 | 3/2004 |
| EP | 1 418 584 A1 | 5/2004 |
| EP | 1 494 235 A1 | 1/2005 |
| EP | 1 505 598 A1 | 2/2005 |
| EP | 1 521 262 A1 | 4/2005 |
| GB | 2 397 687 A | 7/2004 |
| GB | 2 369 718 B | 8/2004 |
| GB | 2 398 670 A | 8/2004 |
| GB | 2 398 671 A | 8/2004 |
| JP | 2002-175662 A | 6/2002 |
| JP | 2003303468 * | 10/2003 |
| WO | WO 98/01852 | 1/1998 |
| WO | WO 98/02885 A1 | 1/1998 |
| WO | WO 98/54713 A1 | 12/1998 |
| WO | WO 98/57413 A1 | 12/1998 |
| WO | WO 00/74053 A1 | 12/2000 |
| WO | WO 02/11136 A1 | 2/2002 |
| WO | WO 03/085668 A1 | 10/2003 |
| WO | WO 03/088239 A1 | 10/2003 |
| WO | WO 2004/006253 A1 | 1/2004 |
| WO | WO 2004/066294 A1 | 8/2004 |
| WO | WO 2004/075185 A1 | 9/2004 |
| WO | WO 2004/075186 A2 | 9/2004 |
| WO | WO 2005/010695 A2 | 2/2005 |

OTHER PUBLICATIONS

GB Search Report for GB 0411163.9 dated Jul. 27, 2005, 1 page.

Schouhamer Immink, Kees A., EFMPlus: The Coding Format of the Multimedia Compact Disc, IEEE Transactions on Consumer Electronics, IEEE Inc., New York, U.S., vol. 41, No. 3, Aug. 1, 1995, pp. 491-497.

Partial European Search Report for Application No. EP 05 25 3063, mailed Jul. 15, 2009, 1 page.

Patent Abstracts of Japan, Publication No. 08129828 A, May 21, 1996, Sony Disc Technol:KK, 1 page.

Patent Abstracts of Japan, Publication No. 2001351319 A, Dec. 21, 2001, Pioneer Electronic Corp, 1 page.

Patent Abstracts of Japan, Publication No. 2002216435 A, Aug. 2, 2002, Victor Co of Japan Ltd, 1 page.

Patent Abstracts of Japan, Publication No. 2002230783 A, Aug. 16, 2002, Matsushita Electric Ind Co Ltd, 1 page.

Patent Abstracts of Japan, Publication No. 20022799732 A, Sep. 27, 2002, Victor Co of Japan Ltd, 1 page.

Patent Abstracts of Japan, Publication No. 2003068024 A, Mar. 7, 2003, Fujitsu Ltd, 1 page.

Patent Abstracts of Japan, Publication No. 2003123401 A, Apr. 25, 2003, Victor Co of Japan Ltd, 1 page.

Patent Abstracts of Japan, Publication No. 2003243993 A, Aug. 29, 2003, Sony Corp, 1 page.

Patent Abstracts of Japan, Publication No. 2004023607 A, Jan. 22, 2004, Sony Corp, 1 page.

Patent Abstracts of Japan, Publication No. 2004062969 A, Feb. 26, 2004, Victor Co of Japan Ltd, 1 page.

Kalker, T. (1999). "System Issues in Digital Image and Video Watermarking for Copy Protection," Multimedia Computing and Systems 1999, IEEE International Conference, Florence, Italy, Jun. 7-11, 1999, Los Alamitos, CA USA IEEE Comput. Soc., US Jun. 7, 1999, pp. 562-567.

Menezes, A. et al. (1997). "Handbook of Applied Cryptography," CRC Press LLC, pp. 20-23 and 275.

* cited by examiner

INPUT:

(data symbol D(i), state S(i))

OUTPUT:

(code word C(i), next state S(i))

(D(0), S(0)) ⟶ (C(0), S(1))

(D(1), S(1)) ⟶ (C(1), S(2))

... ⟶ ...

(D(i), S(i)) ⟶ (C(i), S(i+1))

... ⟶ ...

(D(n), S(n)) ⟶ (C(n), S(n+1))

C(i)
0010000000001001
no trailing zeroes
(hence next state
= State 1)

C(i+1)
0...010...
At least 2
leading zeroes

C(i)
0010001000000000
9 trailing zeroes
(hence next state
= State 4)

C(i+1)
010...
At most 1
leading zero

Case (1)

Case (2)

Case (3)

Case (3.1)

Case (3.2)

Case (3.3)

COPY PROTECTION OF OPTICAL DISCS

This application claims priority to Great Britain Serial No. 0411163.9 filed May 19, 2004 entitled "The Copy Protection of Optical Discs".

BACKGROUND TO THE INVENTION

The present invention relates to a method of copy protecting an optical disc and to a copy protected optical disc. In addition, the application relates to a method for encoding user data and a method for selecting data symbols for incorporation within user data.

Optical discs, such as the various formats of compact discs (CDs) and of digital versatile discs (DVDs) are increasingly used for carrying information for many different applications. The information encoded onto the optical disc is generally very valuable and, accordingly, they are increasingly copied by counterfeiters. Furthermore, recordable CDs and CD writers for writing the information content from one disc to such recordable discs are readily available to the domestic consumer. Recordable DVDs and DVD writers have become as readily available. This means that new and effective methods for copy protecting optical discs are required.

The applicants have proposed various copy protection techniques which utilise data patterns which have poor Digital Sum Value ("DSV") characteristics. For example, in WO 02/11136 data patterns are added to a CD to provide an authenticating signature. These data patterns are chosen to cause DSV problems. It has been found that when a CD writer is used to make a copy of the original disc it has difficulty writing the authenticating signature.

In PCT/GB2004/000241 areas of unbalanced dc content are added to an optical disc by recording onto the disc data with poor DSV characteristics. It has been found that if the areas of recorded data with unbalanced dc content are restricted in size, for example, there is no problem in playing the disc normally but again, copying of the disc is made very difficult.

It will be seen from the above that it is very useful to impress data patterns with poor DSV characteristics onto optical discs.

SUMMARY OF THE INVENTION

The present invention seeks to provide a method of copy protecting an optical disc by impressing subversive data with poor DSV characteristics thereon.

According to a first aspect of the present invention there is provided a method of copy protecting an optical disc on which user data is encoded, the encoding utilising a multimodal code, and the method comprising incorporating selected data symbols within the user data to be encoded onto the disc to ensure that at least one subversive sequence of code words having a large absolute value of DSV is encoded onto the disc.

It is extremely useful if the subversive sequence of code words can be encoded onto the disc by a simple choice of data symbols within the user data. These data symbols need to be chosen such that they will force any encoder to output the subversive sequence of code words.

Preferably, the or each subversive sequence of code words has a large absolute value of DSV.

In an embodiment, sequences of data symbols forcing subversive sequences of code words that have an even number of transitions are provided.

Preferably, subversive sequences of data symbols that when encoded in a certain state S will force an encoder to output S as the next state for that sequence are provided.

In an embodiment, each code word in the or each subversive sequence is the only code word, without alternative, for the corresponding selected data symbol incorporated in the user data.

Additionally and/or alternatively, some of the code words in the or each subversive sequence are one of two or more alternatives for the corresponding selected data symbol incorporated in the user data, but each of the two alternatives is equivalent.

Additionally and/or alternatively, some of the code words in the or each subversive sequence are one of two or more alternatives for the corresponding selected data symbol incorporated in the user data, but all alternatives except one are ruled out by RLL rules.

As indicated above, the subversive sequences of code words may be used to provide an authenticating signature.

Additionally and/or alternatively, the subversive sequences of code words may be used to give unbalanced dc content to selected areas of encoded data on the disc.

Preferably, the or each subversive sequence of code words has a DSV with a rapid rate of change.

According to a further aspect of the present invention there is provided a copy protected optical disc on which user data is encoded, the encoding utilising a multimodal code, wherein at least one subversive sequence of code words having a large absolute value of DSV is encoded onto the disc, the or each subversive sequence of code words having been obtained from selected data symbols incorporated within the user data.

Preferably, the or each subversive sequence of code words has a large absolute value of DSV.

Additionally and/or alternatively, the or each subversive sequence of code words has even transitions.

Additionally and/or alternatively, subversive sequences of data symbols that when encoded in a certain state S will force an encoder to output S as the next state for that sequence are provided.

Additionally and/or alternatively, each code word in the or each subversive sequence is the only code word, without alternative, for the corresponding selected data symbol incorporated in the in user data.

In an embodiment, some of the code words in the or each subversive sequence are one of two or more alternatives for the corresponding selected data symbol incorporated in the user data, but each of the alternatives is equivalent.

Additionally and/or alternatively, some of the code words in the or each subversive sequence are one of two or more alternatives for the corresponding selected data symbol incorporated in the user data, but all the alternatives except one are ruled out by RLL rules.

The or each subversive sequence of code words may be used to provide an authenticating signature.

Additionally and/or alternatively, the or each subversive sequence of code words is used to give unbalanced dc content to selected areas of encoded data on the disc.

Preferably, the or each subversive sequence of code words has a DSV with a rapid rate of change.

The present invention also extends to a method for encoding user data, utilising a multimodal code, the method comprising incorporating selected data symbols into the user data, the data symbols having been selected to force the encoder to produce at least one subversive sequence of code words having a large absolute DSV value.

When dealing with non-multimodal codes such as the EFM modulation used with CDs, it is relatively straight forward to choose a subversive sequence of code words and then to decode that sequence into data symbols for incorporation within the user data. However, expensive computational time would be required in order to undertake the same operation for DVDs.

In an embodiment, the or each subversive sequence of code words has a large absolute value of DSV.

Preferably, the or each subversive sequence of code words has even transitions.

Additionally and/or alternatively, subversive sequences of data symbols that when encoded in a certain state S will force an encoder to output S as the next state for that sequence are provided.

Additionally and/or alternatively, each code word in the or each subversive sequence is the only code word, without alternative, for the corresponding selected data symbol incorporated in the user data.

Additionally and/or alternatively some of the code words in the or each subversive sequence are one of two or more alternatives for the corresponding selected data symbol incorporated in the user data, but each of the two alternatives is equivalent.

Additionally and/or alternatively, some of the code words in the or each subversive sequence are one of two or more alternatives for the corresponding selected data symbol incorporated in the user data, but all the alternatives except one are ruled out by RLL rules.

In a preferred embodiment, each selected data symbol has been identified as a data symbol which has a code word with a large absolute value of DSV where either there is no alternative code word or all possible alternatives have large absolute values of DSV.

Accordingly, in an embodiment, the selected data symbols are identified by looking at the sequence of code words for an input sequence of data symbols, and establishing: if the sequence of code words has even transitions; if the sequence of code words has the next state the same as the initial state; if there are no alternative sequences of code words or all alternative sequences of code words are equivalent, or one of two or more alternative sequences violates the RLL rules; and if the sequence of code words has a large absolute value of DSV; and the data symbols are selected for incorporation within the user data where all the conditions are met.

The present invention also extends to a method of selecting data symbols for incorporation within user data to be encoded using a multimodal code, the selected data symbols being selected so that they are capable of forcing an encoder to produce at least one subversive sequence of code words, the method comprising looking at a possible code word for a data symbol and selecting that data symbol if its code word has a large absolute value of DSV and there are no alternative code words, or all alternative code words are equivalent, or one of two alternative sequences violates the RLL rules.

According to a further aspect of the present invention there is provided a method of selecting data symbols for incorporation within user data to be encoded using a multimodal code, the selected data symbols being selected so that they are capable of forcing an encoder to produce at least one subversive sequence of code words, the method comprising looking at the sequence of code words for a sequence of two or more data symbols, and selecting that sequence of two or more data symbols if the sequence of code words has a large absolute value of DSV and there is not an alternative sequence of code words, or all alternative sequences are equivalent, or one of two alternative sequences violates the RLL rules.

Preferably, the method further comprises selecting the sequence of data symbols where the sequence of code words has even transitions.

The method may further comprise selecting the sequence of data symbols where the sequence of code words has its next state the same as its initial state.

BRIEF DESCRIPTION OF THE DRAWINGS

The present invention will hereinafter be described, by way of example, with reference to the accompanying drawings, in which:

FIGS. 20a and 20b illustrate a flow diagram indicative of the method, which may be extended and/or modified as would be appreciated by those skilled in the pertinent art according to or suggested by the description herein.

DESCRIPTION OF THE PREFERRED EMBODIMENTS

Multimodal Codes

Multimodal codes are Run Length Limitation (RLL) codes based on a state machine where the optimum symbol choice depends not only on the encoder state and the data to be encoded but also on some non-local characteristics such as the DSV. The Eight-to-Sixteen Modulation (ESM or EFM plus) used in DVD discs constitute examples of such codes.

The basic structure of an RLL code based on a state machine is as follows. We say that the code is an RLL(k,d) code if k and d are the minimum and maximum number respectively of consecutive zeroes allowed in an encoded sequence.

Figure 1:
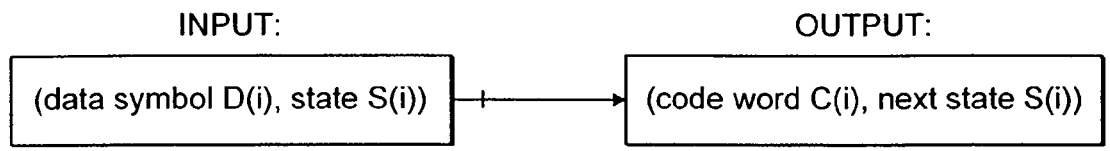
FIG. 1 illustrates the encoding of a data symbol to produce a code word.
Figure 2:
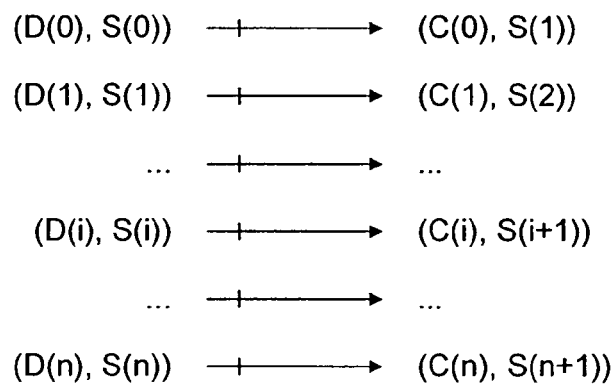
FIG. 2 illustrates the encoding of a sequence of data symbols.

Given an input data symbol D(i) and a state S(i), an output code word $$C(i)=C(D(i),S(i))$$

will be returned together with a next state $$S(i+1)=S(D(i),S(i)),$$

where C(,) is the output code word function and S(,) is the next state function as shown in FIG. 1. The code word C(i) is said to be in state S(i). Suppose an input sequence of data symbols $$\{D(0), D(1), \ldots, D(n)\}$$

and an initial state S(0) are given. For each pair (D(i), S(i)) a new pair (C(i), S(i+1)) will be generated, as shown in FIG. 2, where $$C(i)=C(D(i), S(i));$$

$$S(i+1)=S(D(i), S(i)).$$

The next state S(i+1) is the state in which the data symbol D(i+1) will be encoded. Then the output sequence of code words will be $$\{C(0), C(1), \ldots C(n)\},$$

where C(0) is in state S(0), C(1) is in state S(1), ..., C(n) is in state S(n). The output code words form a sequence of bits that satisfies the RLL(k,d) rule.

Figure 3:
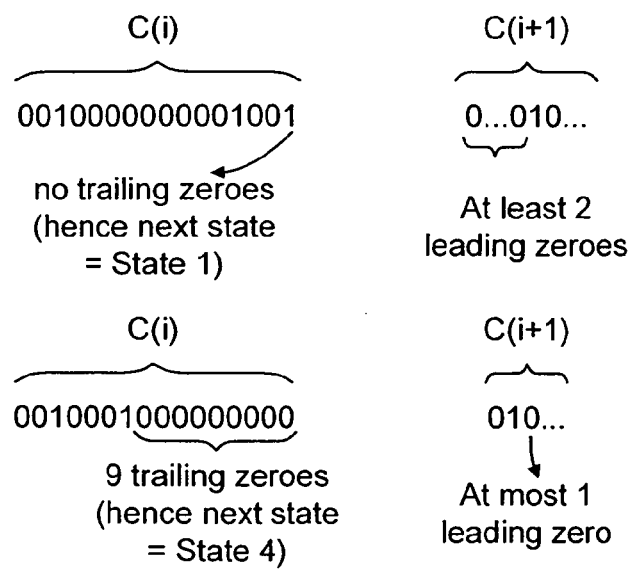
FIG. 3 illustrates states of a code word.

The state of a code word C can be essentially defined by its RLL characteristics. More precisely, it can be defined according to the class of code words that C can follow without violating the RLL rule. For example, consider the class of code words with no trailing zeroes. The state $S_1$ can then be defined as the state in which all the code words with at least k leading zeroes are. Given this definition for state $S_1$, a code word with no trailing zeroes can be followed by any code word in state $S_1$. Hence, state $S_1$ can be set as the next state for all the code words with no trailing zeroes. Similarly, consider the class of code words having d trailing zeroes and define state $S_2$ as the state in which all the code words with no leading zeroes are, so that state $S_2$ can be set as the next state for all the code words with d trailing zeroes. FIG. 3 shows some examples for ESM, which is an RLL(2,10)-code. In ESM, State 1 is defined to be the class where all the code words have at least two leading zeroes. Therefore the next state for the code word 0010000000001001 is set to be State 1.

Similarly, State 4 is defined to be the class where all the code words have at most one leading zero. Since in ESM there are no code words having more than 9 trailing zeroes, any ESM code word with more than 2 trailing zeroes can be followed by a code word in State 4 and hence can have the next state set to State 4.

Figure 4:
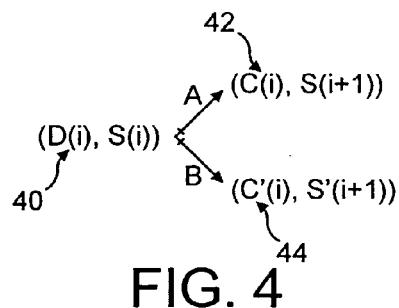
FIG. 4 illustrates the encoding options afforded by a multimodal code.

A multimodal code provides options in the way an input data symbol 40 can be encoded, as shown in FIG. 4 where two alternatives 42 and 44 are provided. For each input sequence of data symbols, there is typically a number of different possible output sequences of code words. An encoder will select one output sequence among all the possible choices according to some non-local characteristics of the encoded sequence, such as DSV.

Figure 5:
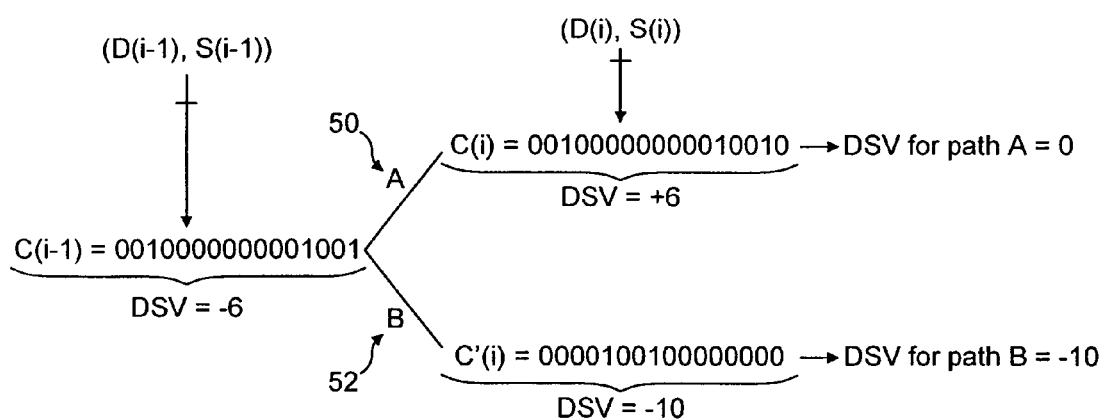
FIG. 5 illustrates two possible output code words for an input data symbol.

For example, FIG. 5 shows that an input sequence of data symbols {D(i−1), D(i)} has two possible output sequences; the sequence {C(i−1), C(i)} corresponding to path A 50 and the sequence {C(i−1), C'(i)} corresponding to path B 52. Hence an encoder can choose between two alternative outputs for the input sequence {D(i−1), D(i))}. If the encoder is designed to minimize the absolute value for the DSV (|DSV|), then it will clearly choose path A.

Figure 6:
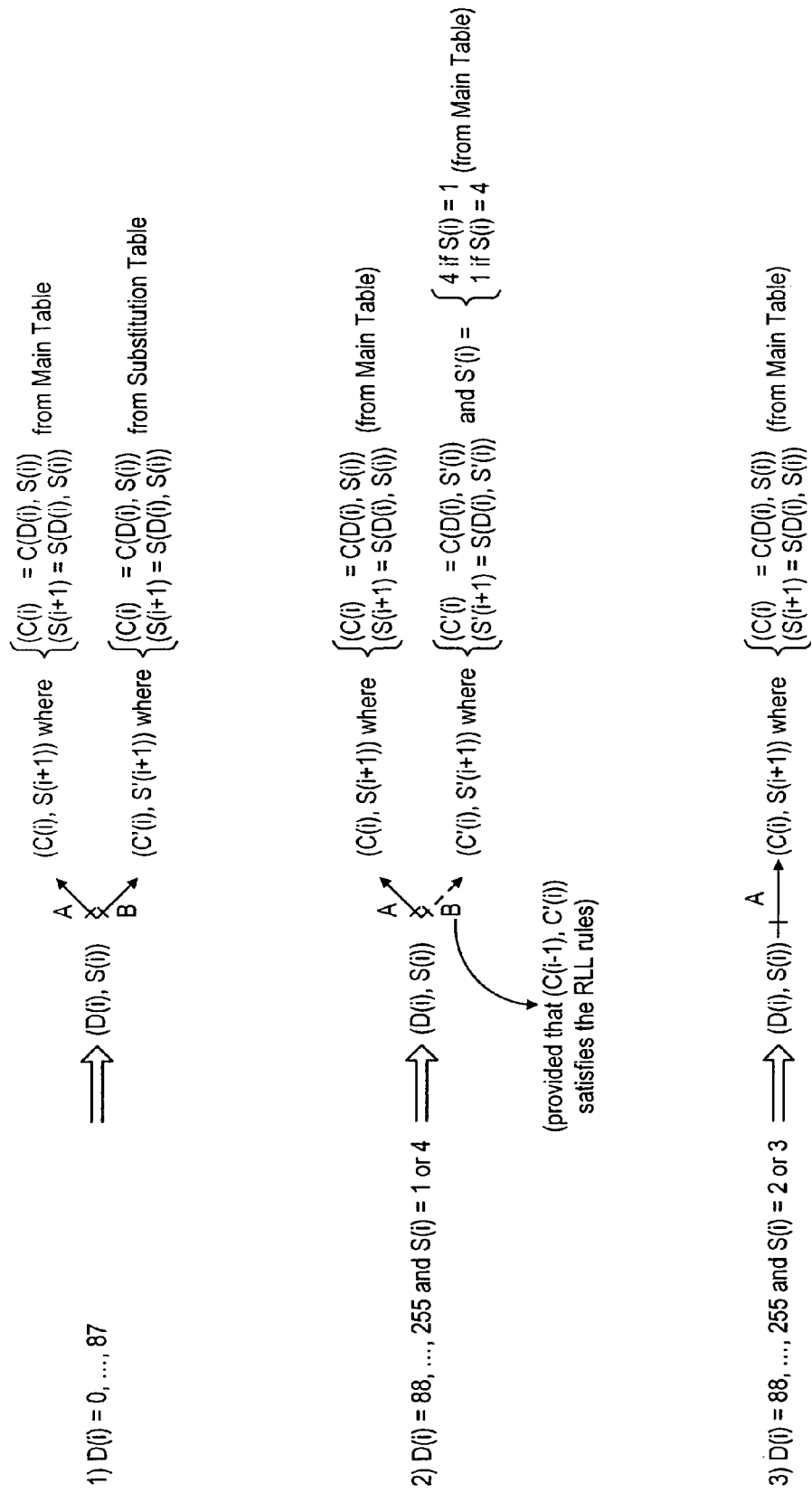
FIG. 6 illustrates the available code words for ESM encoding.

The ESM is a 4-state multimodal code that converts 8-bit input data symbols into 16-channel bit code words. This conversion is performed according to two look-up conversion tables, the Main Table and the Substitution Table. For each state and for each input data symbol, the Main Table contains the list of the corresponding ESM code words. The Substitution Table contains alternative encoding for the data symbols included in the range 0, . . . ,87. Hence, given a data symbol D(i) in the range 0, . . . ,87 and a state S(i), there exists two alternative outputs C(i), S(i+1) and C'(i), S'(i+1), one from the Main Table, the other from the Substitution Table. For the data symbols in the range 88, . . . ,255 that are to be encoded either in State 1 or in State 4 there can be also alternative outputs: data symbols 88, . . . ,255 to be encoded in State 1 can also be encoded in State 4, provided that the RLL rules are satisfied and, similarly, data symbols 88, . . . ,255 to be encoded in State 4 might as well be encoded in State 1. No alternative encoding exists for data symbols in the range 88, . . . ,255 to be encoded either in State 2 or in State 3. The available outputs for the data symbols are shown in FIG. 6.

Figure 7:
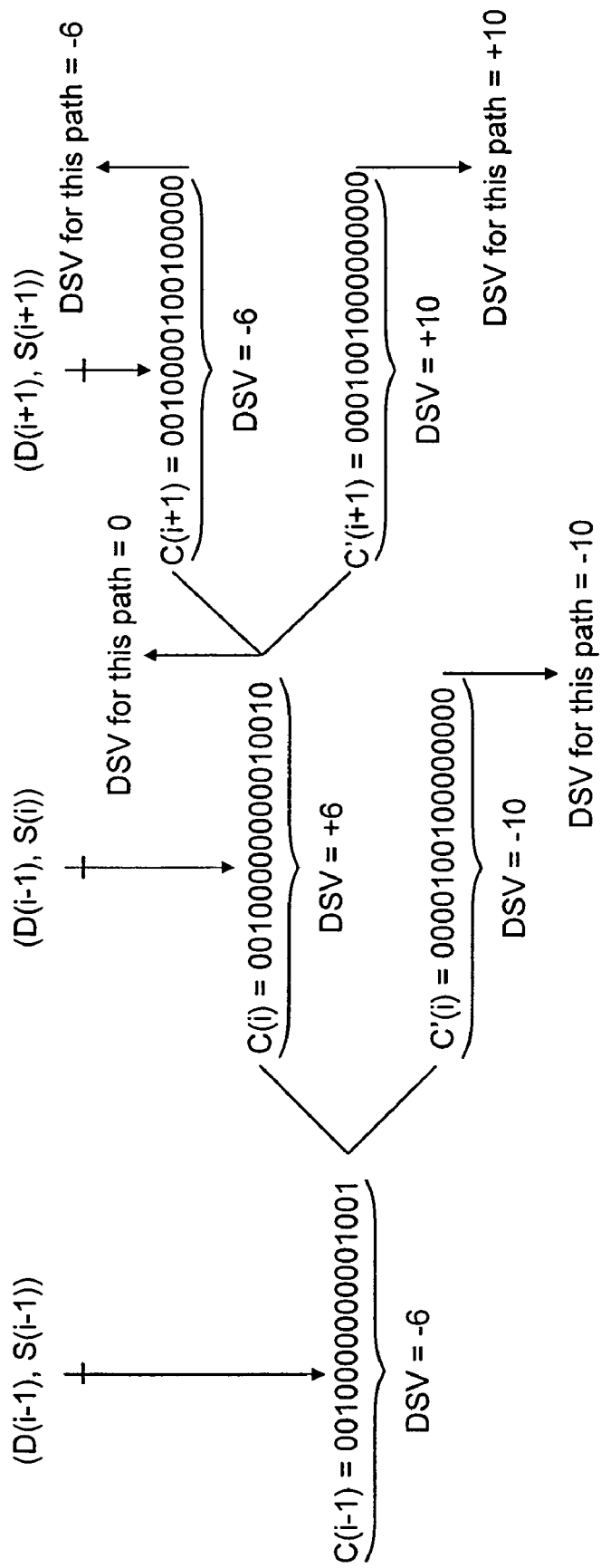
FIG. 7 shows encoding for application to an optical disc where the encoder seeks to minimise the absolute DSV values.

The tables and the methods that are used to carry out the conversion are arranged in such a way that the absolute value of the DSV (|DSV|) of the output sequence of code words can be minimised as is illustrated in FIG. 7. Hence an "intelligent encoder", that is, an encoder designed to select the optimum choice among a number of output choices, will generally be able to minimise the |DSV| effectively. However, there are cases when even an intelligent encoder will be forced to output a sequence of code words having a relatively large value for |DSV|, either because there are no available alternatives for that sequence or because the possible alternatives will all result in a large |DSV| value.

We say that a sequence of code words is a subversive sequence if it is capable of inducing uncorrectable read errors when read from an optical disc. We say that a sequence of input data symbols is a subversive sequence if the encoder will be forced to output a subversive sequence of code words when presented with that input sequence of data symbols.

It is well known that encoded sequence having large |DSV| can induce uncorrectable read errors. In this case we speak of subversive DSV (SDSV) sequences.

The Problem of Obtaining SDSV Sequences

Figure 8:
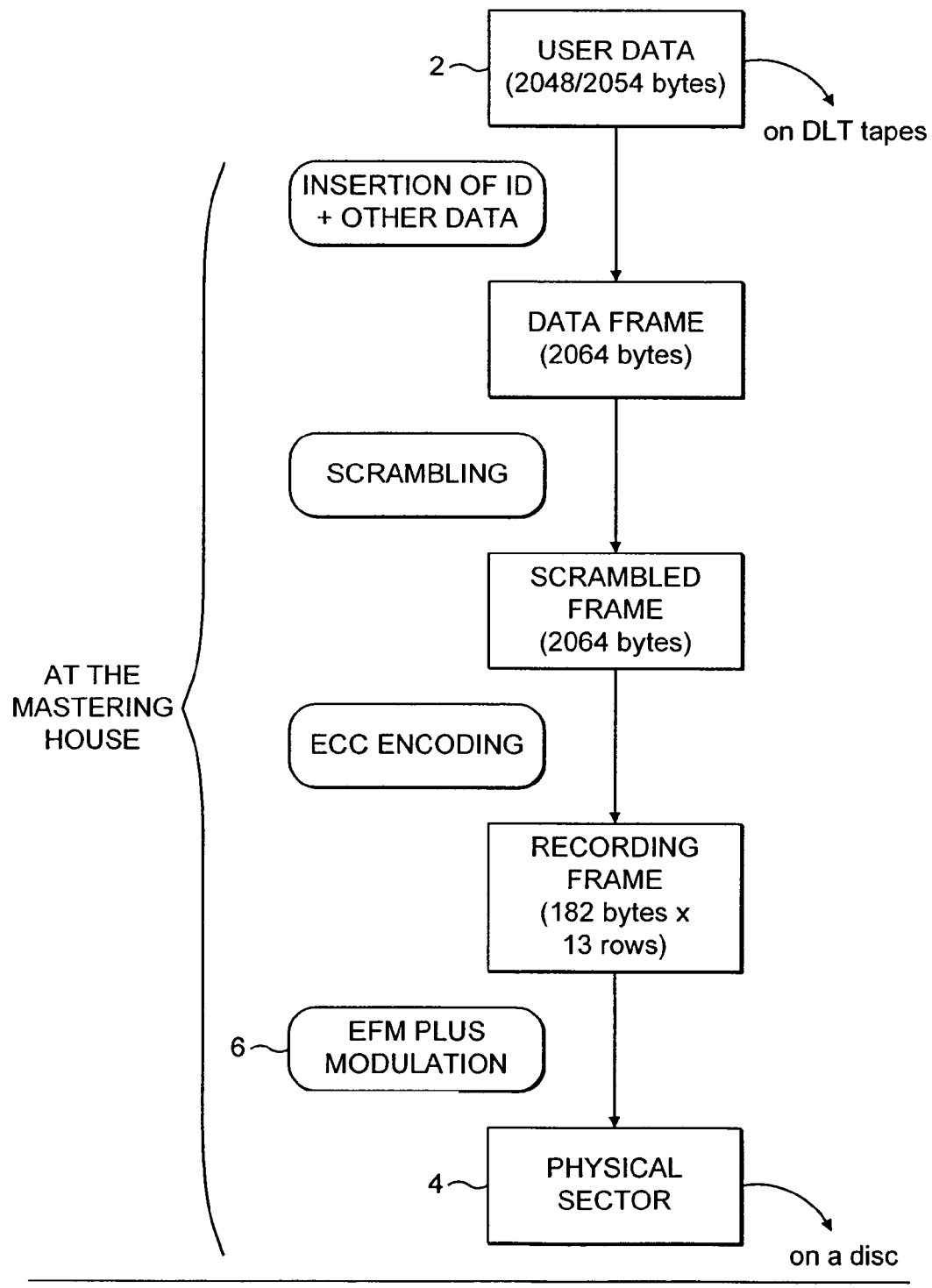
FIG. 8 shows the data levels encountered in preparing data for application to a DVD.

SDSV sequences of input data symbols are extremely valuable for copy protection techniques based on subversive data, because they allow the creation of unreadable data on the disc by working exclusively at the user data 2 level rather than at the physical sector 4 level and hence prior to writing the user data on DLT tapes. The data levels when applying user data to an optical disc, for example, a DVD, are shown in FIG. 8. In other words, the insertion of SDSV sequences of data symbols in the user data 2 will force a given encoder for the EFM Plus Modulation to output physical sectors 4 containing SDSV sequences of code words.

However, in multimodal codes such as ESM very few SDSV sequences of data symbols capable of tweaking intelligent encoders can be found. This makes an exhaustive approach, that is, considering all the possible sequences of data symbols and the |DSV| of their corresponding encoded sequences of code words, as output by an intelligent decoder, for finding SDSV sequences of data symbols quite unpractical.

Figure 9:
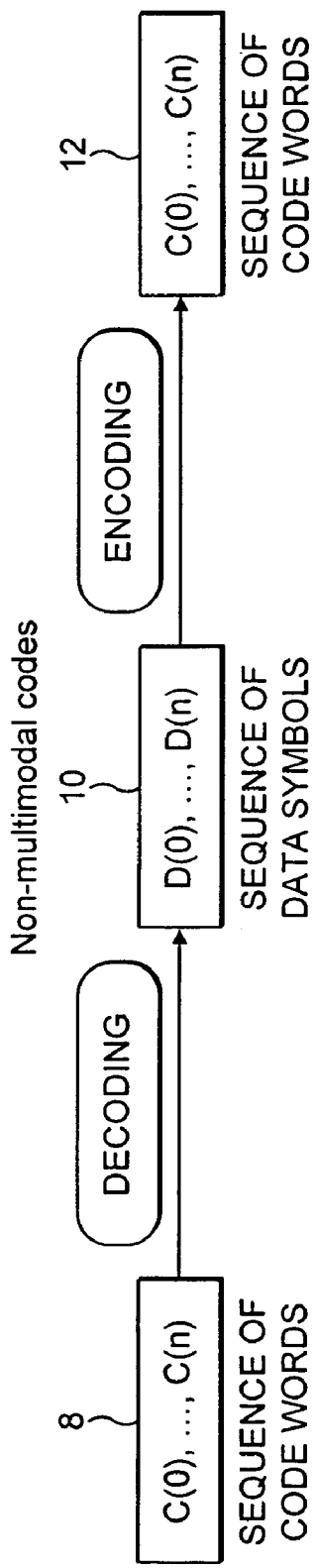
FIG. 9 illustrates the encoding and decoding of non-multimodal codes.
Figure 10:
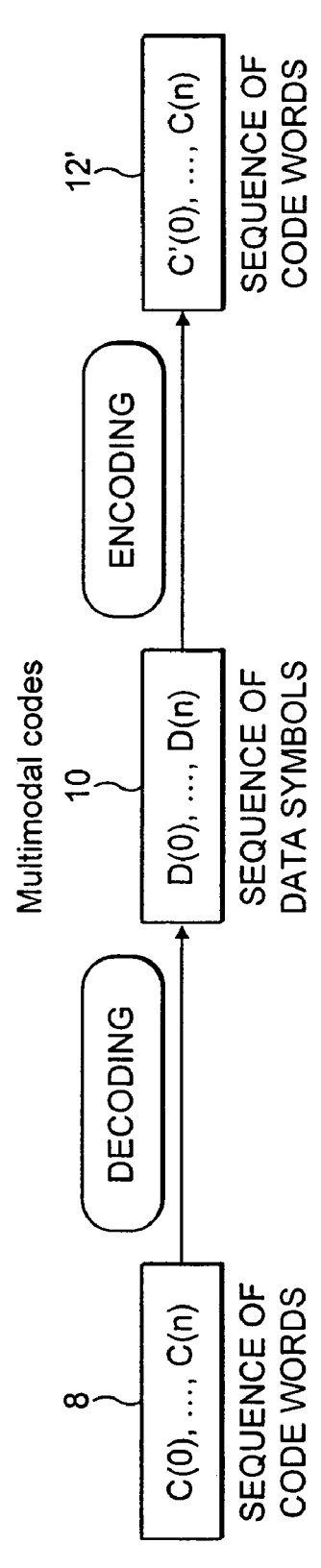
FIG. 10 illustrates the encoding and decoding of multimodal codes.

An alternative approach might consist of starting from SDSV sequences of code words, and using a decoder to decode those sequences into sequences of data symbols. Although this could be a viable way for non-multimodal codes such as EFM modulation, in the case of multimodal codes the situation is more complex, as shown in FIGS. 9 and 10. FIG. 9 shows the non-multimodal codes case: a sequence of code words 8 is decoded into a sequence of data symbols 10; the sequence of data symbols is then encoded to give the output sequence of code words 12 which is equal to the sequence of code words 8. FIG. 10 shows a similar process but in the case of multimodal codes: in this case the output encoded sequence of code words 12' is not necessarily equal to the sequence of code words 12. Because of the way the ESM conversion tables codes are constructed and because of the algorithms employed by the encoder to perform the conversion, in most cases, given a SDSV sequence of code words 8, the sequence of data symbols 10 decoded from that SDSV sequence of code words will also have alternative non-SDSV encoded sequences of code words that the conversion algorithm will prefer to the SDSV one. Hence, given the input sequence of data symbols 10, an intelligent encoder will output a non-SDSV sequence of code words 12' rather than the SDSV sequence 8.

It follows that any exhaustive search for SDSV sequences in multimodal codes is computationally very expensive.

How to Obtain SDSV Sequences

It is required to find a method capable of determining forced subversive sequences, that is, sequences of data symbols capable of forcing an encoder to output subversive sequences of code words. In particular, it is required to generate SDSV patterns for ESM Modulation, that is, sequences $\{D_0, \ldots, D_r\}$ of data symbols (plus an initial state) such that the corresponding encoded sequence $\{C_0, \ldots, C_r\}$ of code words has "large" |DSV| and such that they can be repeated "effectively" from a DSV point of view as many times as required. More precisely, a sequence $\{D_0, \ldots, D_r\}$ of data symbols with initial state $S_0$ is a SDSV pattern if when repeated, say, t times $$\underbrace{\{D_0, \ldots, D_r}_{1}, \underbrace{D_0, \ldots, D_r}_{2}, \underbrace{\ldots, D_0, \ldots, D_r\}}_{t}$$

will force a given encoder to output the sequence of code words $$\underbrace{\{C_0, \ldots, C_r}_{1}, \underbrace{C_0, \ldots, C_r}_{2}, \underbrace{\ldots, C_0, \ldots, C_r\}}_{t}$$

whose |DSV| is $$|DSV(\underbrace{C_0, \ldots, C_r}_{1}, \underbrace{C_0, \ldots, C_r}_{2}, \underbrace{\ldots, C_0, \ldots, C_r}_{t})| = t*|DSV(C_0, \ldots, C_r)|.$$

The method is described with particular reference to ESM. However, the method outlined can be used with multimodal RLL codes other than ESM.

Preferably, the method will provide a list of patterns of data symbols forcing large |DSV| that can result in SDSV when ESM modulated.

If the input data is subject to some sort of manipulation, such as scrambling, prior to ESM, then this manipulation will have to be taken into account when writing the SDSV sequences, so that these sequences will result in forced SDSV sequences after the manipulation.

A method for generating forced SDSV sequences and, in particular, SDSV patterns will now be described.

Figure 11:
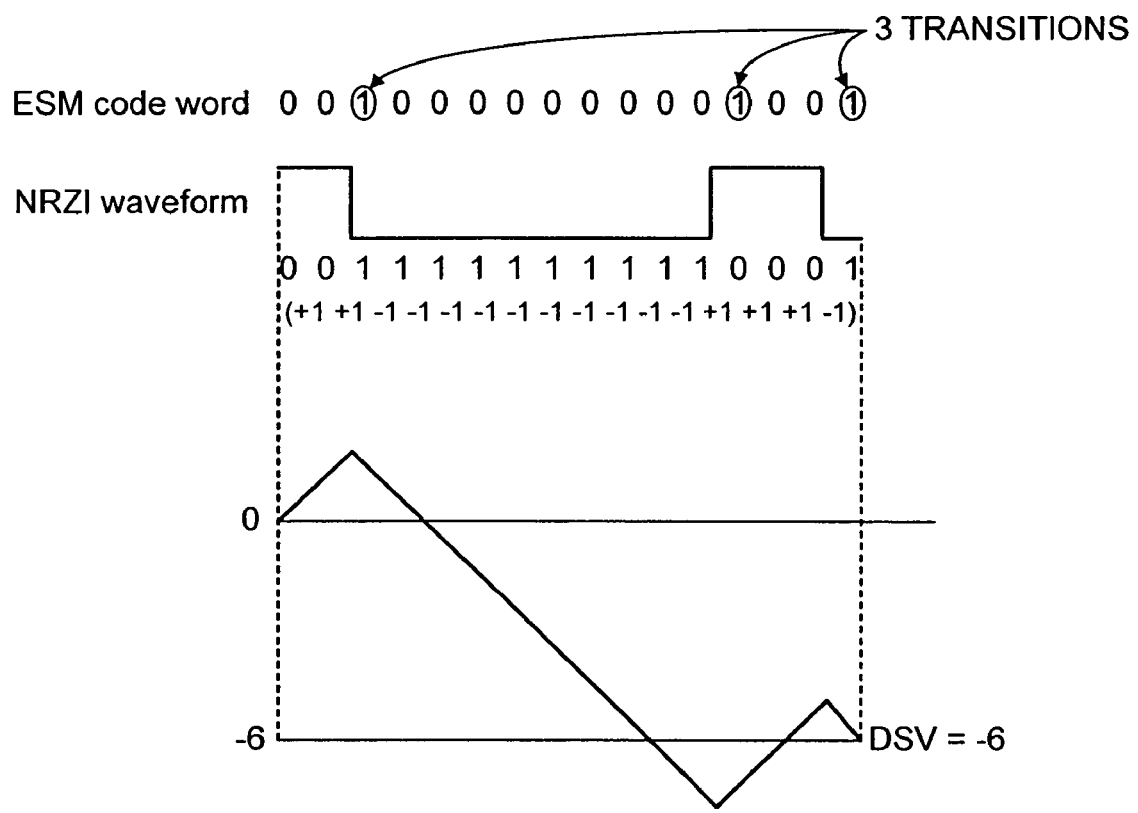
FIG. 11 illustrates characteristics of a code word.

For each code word the following characteristics need to be considered as illustrated in FIG. 11.

DSV;
number of transitions (i.e. the number of 1's that the code word contains);
state;
next state.

Given a code word C we will use the following notation:
DSV(C) for the DSV of C, considered with its sign;
|DSV(C)| for the |DSV| of C;
Transitions(C) for the number of transitions of C;
State(C) for the state in which C has to be encoded;
NextState(C) for the next state of C.

By convention, we compute the DSV of a code word as shown in FIG. 11.

Observe that the concepts above can also be applied to any sequence of bits and, therefore, in particular, to a sequence of code words. Hence, the notation above will apply also when considering a sequence of code words.

We say that two pairs (C, S) and (C', S') (or two sequences $\{(C_j, S_j)\}$ and $\{(C'_j, S'_j)\}$ of pairs) are equivalent if and only if
a) DSV(C) DSV(C')>=0 (i.e. DSV(C) and DSV(C') have the same sign or one of the two is zero);
b) Transitions(C) and Transitions(C') have the same parity (that is, they are either both even or both odd);
c) S=S';
d) |DSV(C)| and |DSV(C')| are "almost equal".
|DSV(C)| and |DSV(C')| are "almost equal" if |DSV(C')|=|DSV(C)|+L, where L is a (signed) integer. The smaller |L| is, the more restrictive the definition of "almost equal" is.

If (C, S) and (C', S') are equivalent we write (C, S)~(C', S');

if they are not, we write

~(C, S)~(C', S').

Observe that a sequence $\{D_0, \ldots, D_r\}$ of data symbols with a given initial state $S_0$ is a SDSV pattern if the corresponding encoded sequence $\{C_0, \ldots, C_r\}$ of code words satisfies the following conditions:
a) the number $(C_0, \ldots, C_r)$ of transitions of the sequence $\{C_0, \ldots, C_r\}$ is even;
b) the next state for the sequence $\{D_0, \ldots, D_r\}$ when encoded with initial state $S_0$ is $S_0$;
c) |DSV $\{(C_0, \ldots, Cr)\}$| is "large";

d) either no alternative encoded sequences exist or if an alternative encoded sequence $\{C_0', \ldots, C_r'\}$ exists then either it is "equivalent" to $\{C_0, \ldots, C_r\}$ or else it will be ruled out because $\{C_r, C_0'\}$ violates the RLL rule.

Let $m_0$ be the maximum $|DSV|$ value among all the ESM code words. We will consider the code words having.

$$|DSV| = m_0 - 2i$$

for $i = 0, \ldots, M$ where M is an integer $0 <= M <= m_0/2$. The value of M depends on how strong the required SDSV sequences must be.

Observe that the DSV value of a sequence of bits of even length is always even.

In what follows we assume that, given the conversion tables, the encoding algorithm is as effective as possible with regard to the minimisation of $|DSV|$. Since this is not usually the case, it is possible to adapt the method described below to the particular encoding algorithm used, in order to exploit its weaknesses.

Overview of the Method

For $i = 0, \ldots, M$ where $0 <= M <= m_0/2$, let $C_0$ be a code word such that $$|DSV(C_0)| = m_0 - 2i.$$

Let $D_0$ and $S_0$ be respectively a data symbol and a state such that $$C_0 = C(D_0, S_0).$$

The pair $(D_0, S_0)$ is not necessarily uniquely determined. There might exist different pairs $(D_0, S_0)$ and $(D_0', S_0')$ such that $C(D_0, S_0) = C(D_0', S_0')$.

Step 1

Let $(D_{-1}, S_{-1})$ be such that $S(D_{-1}, S_{-1}) = S_0$ and let $C_{-1} = C(D_{-1}, S_{-1})$. If $|DSV(C_{-1}, C_0)|$ is "small", then we discard the pair $(D_{-1}, S_{-1})$ and we examine another suitable pair $(D_{-1}, S_{-1})$.

When we write that a code word C is such that $C = C(D,S)$ without any further specification, we mean that C is the default encoded code word corresponding to (D,S), i.e. option A in FIG. 6.

$|DSV(C_{-1}, C_0)|$ is "small" if $|DSV(C_{-1}, C_0)| < |DSV(C_0)| + T$, where T is a parameter such that $0 <= T <= m_0$. Hence $|DSV(C_{-1}, C_0)|$ is "large" if $|DSV(C_{-1}, C_0)| >= |DSV(C_0)| + T$. Obviously the larger is T, the stronger the SDSV sequence will be, if any is found.

Let us assume that $|DSV(C_{-1}, C_0)|$ is "large". We have one of the following cases as shown in FIG. 6.

1) $D_0$ is in the range $0, \ldots, 87$;
2) $D_0$ is in the range $88, \ldots, 255$ and $S_0$ is equal either to State 1 or to State 4;
3) $D_0$ is in the range $88, \ldots, 255$ and $S_0$ is equal either to State 2 or to State 3.

In the first case, a pair $(C_0', S_1')$ alternative to $(C_0, S_1)$ will always exist. In the second case, an alternative pair $(C_0', S_1')$ might exist. In the third case no alternative exists.

Figure 12:
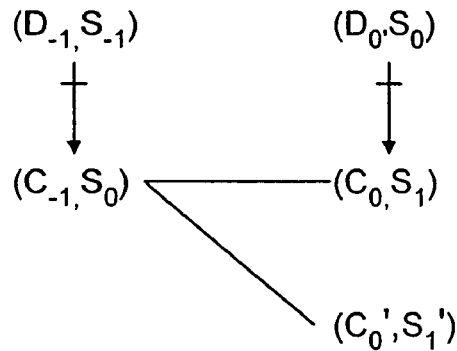
FIG. 12 shows three possible cases of pairs of data symbols with their code words.
Figure 12:
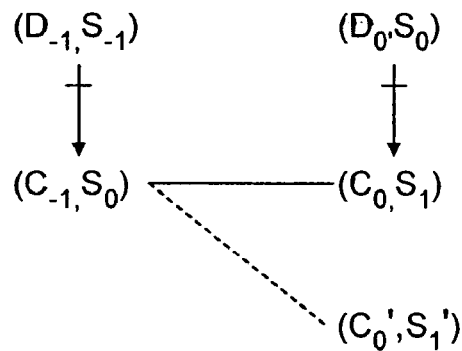
Figure 12:
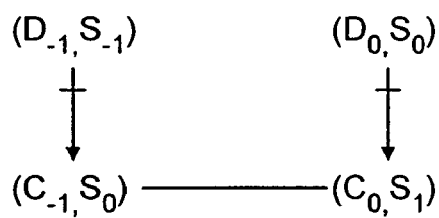

Let us consider the three cases which are set out in FIG. 12.

Case (1)

Figure 13:
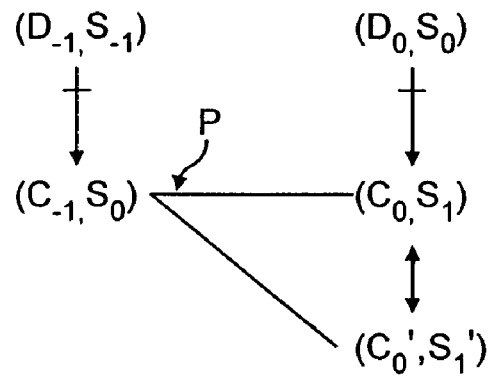
FIG. 13 illustrates the three cases of FIG. 12 after Step 1.
Figure 13:
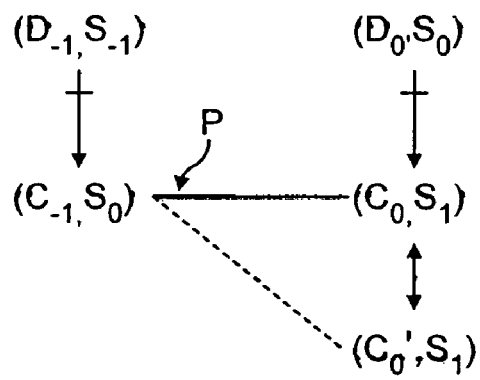
Figure 13:
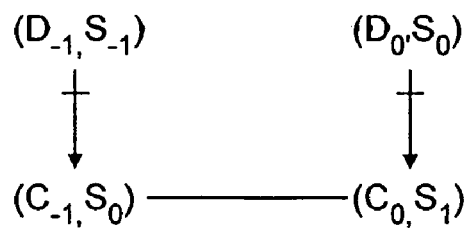

Please refer to FIG. 12, Case (1). If $(C_0', S_1') \sim (C_0, S_1)$, we discard $(D_{-1}, S_{-1})$ and find another suitable pair $(D_{-1}, S_{-1})$. Let us now assume that $(C_0', S_1') \sim (C_0, S_1)$, as shown in FIG. 13, Case (1). Then we can proceed from Step 2 below.

Please refer to FIG. 12, Case (2). If $\{C_{-1}, C_0'\}$ does not violate the RLL rules, and $(C_0', S_1') \sim (C_0, S_1)$, then we can proceed as described in Case (1) above. If, $\{C_{-1}, C_0'\}$ does not violate the RLL rules but $\neg (C_0', S_1') \sim (C_0, S_1)$, then we discard $(D_{-1}, S_{-1})$, find another suitable pair $(D_{-1}, S_{-1})$ such that $S(D_{-1}, S_{-1}) = S_0$ and proceed from Step 1 above. If, finally, $\{C_{-1}, C_0'\}$ does violate the RLL rules, we are in Case (3) of FIG. 12 and we can proceed as in Case (3) below.

We are in the situation shown in FIG. 12, Case (3). We can proceed from Step 2 below.

Step 2

We are now in one of the three cases shown in FIG. 13, where any path alternative to the path P is actually equivalent to the path P. It follows that it is not restrictive to ignore any alternative path and assume that we are in the situation shown in FIG. 13, Case (3).

Figure 14:
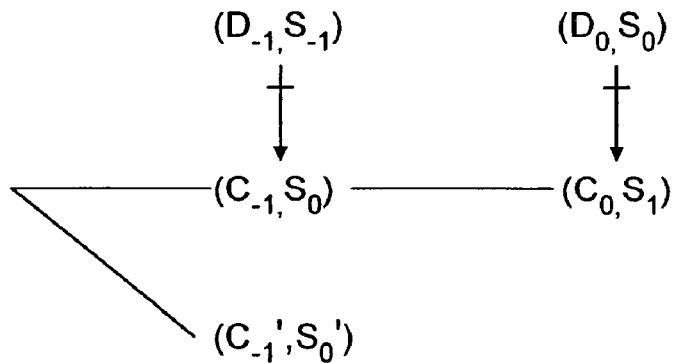
FIG. 14 illustrates the three cases of FIG. 13 after Step 2.
Figure 14:
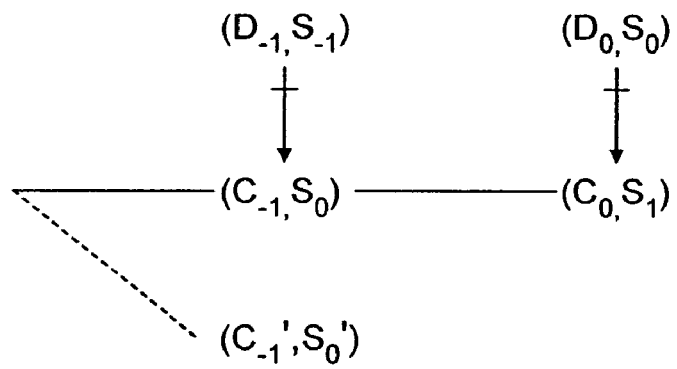
Figure 14:
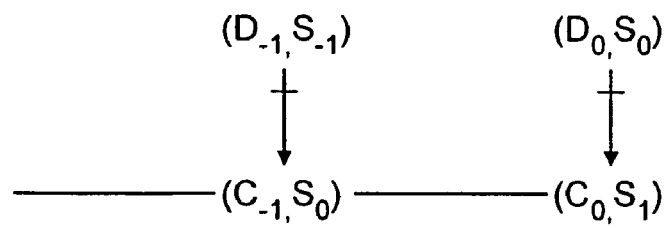

We have three possible subcases as indicated in FIG. 14.

1. $D_{-1}$ is in the range $0, \ldots, 87$;
2. $D_{-1}$ is in the range $88, \ldots, 255$ and $S_{-1}$ is equal either to State 1 or to State 4;
3. $D_{-1}$ is in the range $88, \ldots, 255$ and $S_{-1}$ is equal either to State 2 or to State 3.

Case (3.1)

Figure 15:
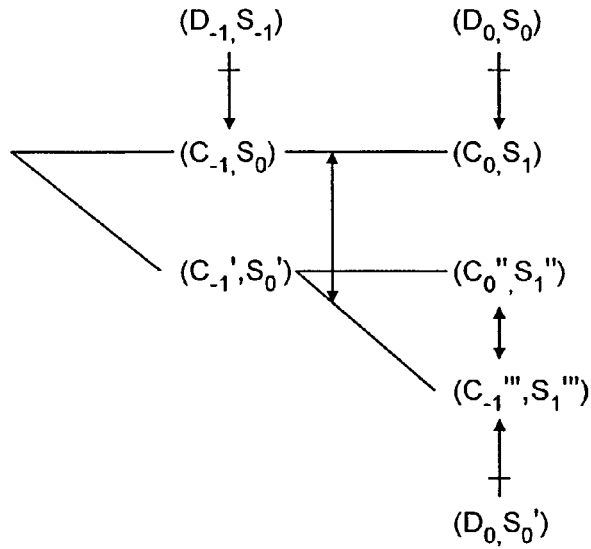
FIG. 15 illustrates possible subcases of the three cases of FIG. 14.
Figure 15:
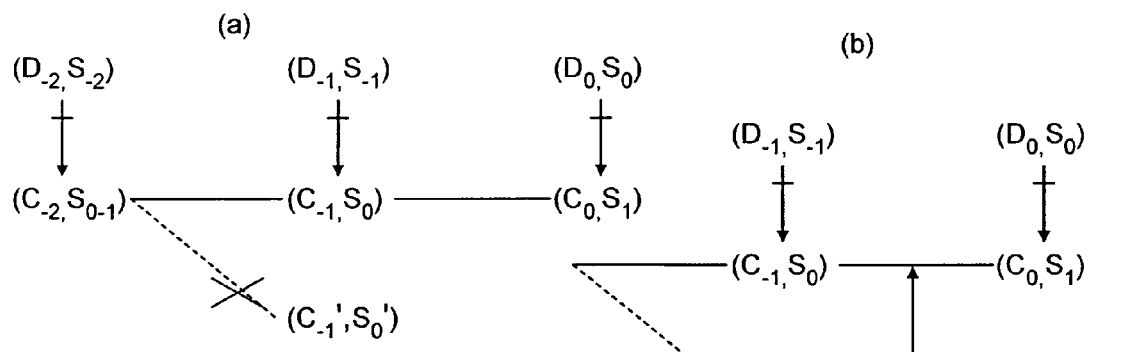
Figure 15:
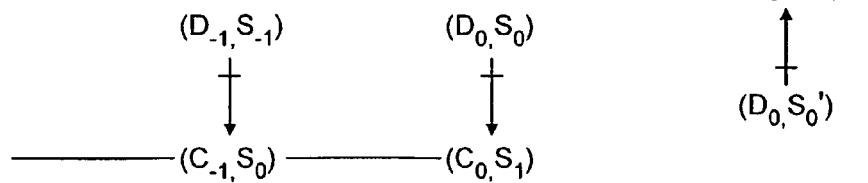

For simplicity, if $\neg (C_{-1}', S_0') \sim (C_{-1}, S_0)$, we discard $(D_{-1}, S_{-1})$ and find another suitable pair $(D_{-1}, S_{-1})$. Observe that, in fact, it is not necessary to have $$(C_{-1}', S_0') \sim (C_{-1}, S_0).$$

as it would suffice to check that i. $(C_0'', S_1'') \sim (C_0''', S_1''')$ and
ii. $\{(C_{-1}', S_0'), (C_0'', S_1'')\} \sim \{(C_{-1}, S_0), (C_0, S_1)\}$ and discard $(D_{-1}, S_{-1})$ only if one of these conditions is not satisfied as shown in FIG. 15, Case (3.1)).

Figure 16:
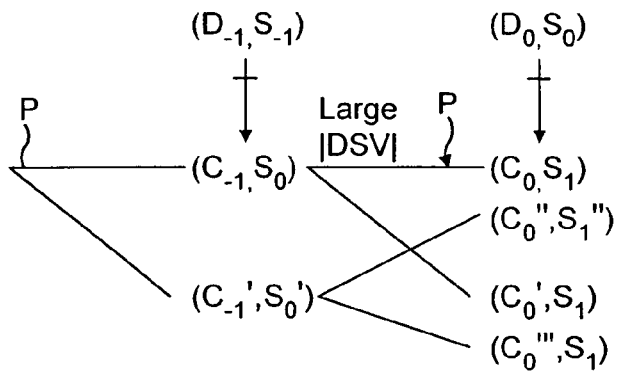
FIG. 16 shows the three subcases (3.1), (3.2) and (3.3)
Figure 16:
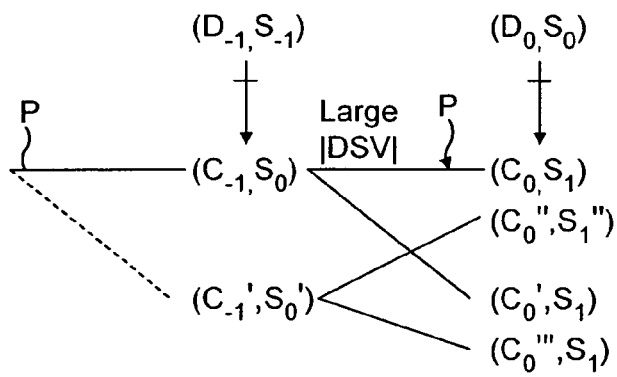
Figure 16:
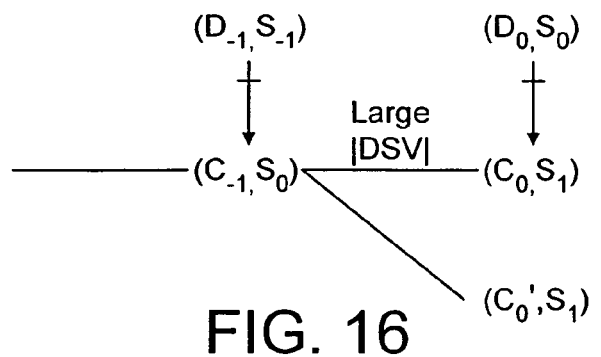

We can now assume that we are in the situation shown in FIG. 16, Case (3.1), where any path alternative to the path P is equivalent to it. Observe that $C_0''$ and $C_0$ might or might not be equal, and the same applies for $C_0'''$ and $C_0'$.

Case (3.2)

For simplicity, if $\neg (C_{-1}', S_0') \sim (C_{-1}, S_0)$, we discard $(D_{-1}, S_{-1})$ and find another suitable pair $(D_{-1}, S_{-1})$. In fact, if $(C_{-1}', S_0')$ and $(C_{-1}, S_0)$ are not equivalent, we could still find a suitable pair $(C_{-2}, S_{-1})$ such that the sequence $\{C_{-2}, C_{-1}'\}$ violates the RLL rules as shown in FIG. 15, Case (3.2)(a). Alternatively, we could check conditions i. and ii. above as illustrated in FIG. 15, Case (3.2)(b).

Hence we can assume to be in the situation shown in FIG. 16, Case (3.2), where any path alternative to the path P is equivalent to it.

Case (3.3) FIG. 16, Case (3.3) describes this case.

Figure 17:
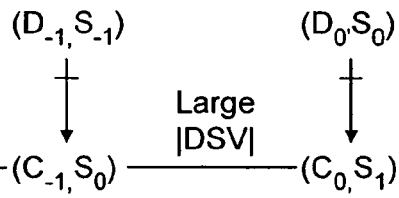
FIG. 17 shows a sequence of data symbols which will force an encoder to choose code words with a large absolute value of DSV.

Suppose now that from any of cases (3.1), (3.2) or (3.3) we have found a sequence $\{D_{-1}, D_0\}$ with initial state $S_{-1}$ as described in FIG. 17 (one path only is shown because any other alternative path is equivalent to the one shown). If $\{D_{-1}, D_0\}$ with initial state $S_{-1}$ is a SDSV pattern (according to the definition above), we are done. If it is not, then we can proceed from Step 1 above, where, instead of considering a pair $(D_{-1}, S_{-1})$ such that $S(D_{-1}, S_{-1}) = S_0$, we will now consider a pair $(D_{-2}, S_{-2})$ such that $S(D_{-2}, S_{-2}) = S_{-1}$, and instead of considering the sequence $\{C_{-1}, C_0\}$, we will consider the sequence $\{C_{-2}, C_{-1}, C_0\}$.

If, on the contrary, no suitable sequence $\{D_{-1}, D_0\}$ has been found, we will examine another code word $C_0$ having the required $|DSV|$ value and restart from Step 1. Once we have exhausted all the possibilities for that particular $|DSV|$ value, we can increase by 1 the value for i.

We will be considering longer and longer sequences $\{C_{-n}, \ldots, C_{-1}, C_0\}$. Clearly, when n reaches the maximum preferred length, we can output the corresponding SDSV sequence of data symbols $\{D_{-n}, \ldots, D_{-1}, D_0\}$ (which will not be necessarily a SDSV pattern).

EXAMPLE

Suppose we are considering code words having $|DSV|=4$. Suppose that the code word $C_0=1001001000000100$, which has DVS equal to $-4$, has been selected from the ESM Conversion Tables. From the Tables we can see that $D_0=98$ and $S_0=$State 3 are such that $C_0=C(D_0, S_0)$. We now consider all the pairs $(D_{-1}, S_{-1})$ such that $S(D_{-1}, S_{-1})=S_0=$State 3. Let us assume we have selected $D_{-1}=88$, $S_{-1}=$State 2 among these pairs. We have $C(D_{-1}, S_{-1})=0001000100010000$.

Now, $DSV(C_{-1}, C_0)=+2$. But then we discard the pair $(D_{-1}, S_{-1})=(88, State 2)$ because $|DSV(C_{-1}, C_0)|$ is "small", as $|DSV(C_{-1}, C_0)|=2<|DSV(C_0)|=4$.

Therefore we consider another pair $(D_{-1}, S_{-1})$ such that $S(D_{-1}, S_{-1})=$State 3, say $(D_{-1}, S_{-1})=(131, State 3)$.

In this case we have $C(D_{-1}, S_{-1})=1001001000000100$ and $DSV(C_{-1}, C_0)=-8$. Hence $|DSV(C_{-1}, C_0)|$ is "large" enough as $|DSV(C_{-1}, C_0)|=8>=|DSV(C_0)|+4$.

Figure 18:
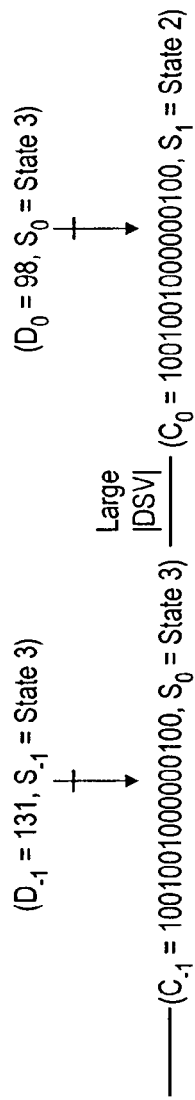
FIG. 18 shows an example of a sequence of data symbols, obtained after Step 1 and Step 2, which will force an encoder to output SDSV sequences but which is not an SDSV pattern.

Observe that $D_0$ is in the range $88, \ldots, 255$ and $S_0=$State 3 and that also $D_{-1}$ is in the range $88, \ldots, 255$ and $S_{-1}=$State 3. FIG. 18 illustrates the present situation: we have found a sequence of data symbols $\{D_{-1}, D_0\}=(131, 98)$ with initial state $S_{-1}$ such that the corresponding sequence of code words $\{C_{-1}, C_0\}$ has large $|DSV|$. We can now verify whether $\{D_{-1}, D_0\}$ with initial state $S_{-1}$ is a SDSV pattern. Conditions a), c) and d) for the definition of a SDSV pattern are satisfied as:
  a) Transitions$(C_{-1}, C_0)=8$;
  c) $|DSV(C_{-1}, C_0)|$ is large;
  d) no alternative encoded sequences exist.

However, NextState$(D_{-1}, D_0)=$State 2, which is not equal to $S_{-1}=$State 3. Therefore $(D_{-1}, D_0)$ with initial state $S_{-1}$ is not a SDSV pattern.

Hence now we look for a pair $(D_{-2}, S_{-2})$ such that $S(D_{-2}, S_{-2})=S_{-1}=$State 3. So let $(D_{-2}, S_{-2})=(161, State 2)$.

We have $C_{-2}=C(D_{-2}, S_{-2})=0100000000010000$. Then $DSV(C_{-2}, C_{-1}, C_0)=-12$ and hence $|DSV(C_{-2}, C_{-1}, C_0)|$ is "large" as $|DSV(C_{-2}, C_{-1}, C_0)|=12>=|DSV(C_{-1}, C_0)|+4$.

Figure 19:
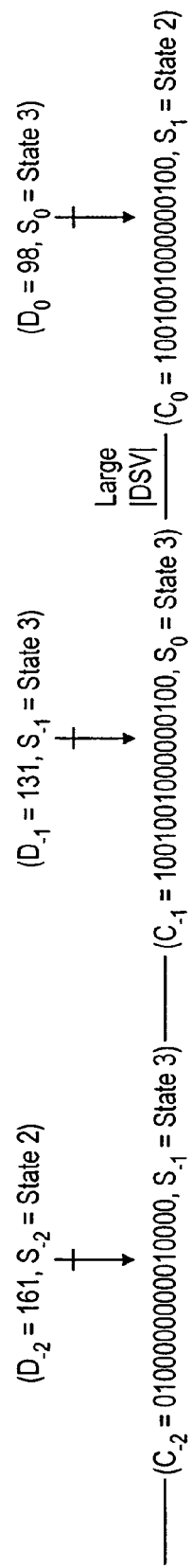
FIG. 19 shows an example of an SDSV pattern of data symbols.
Figure 20A:
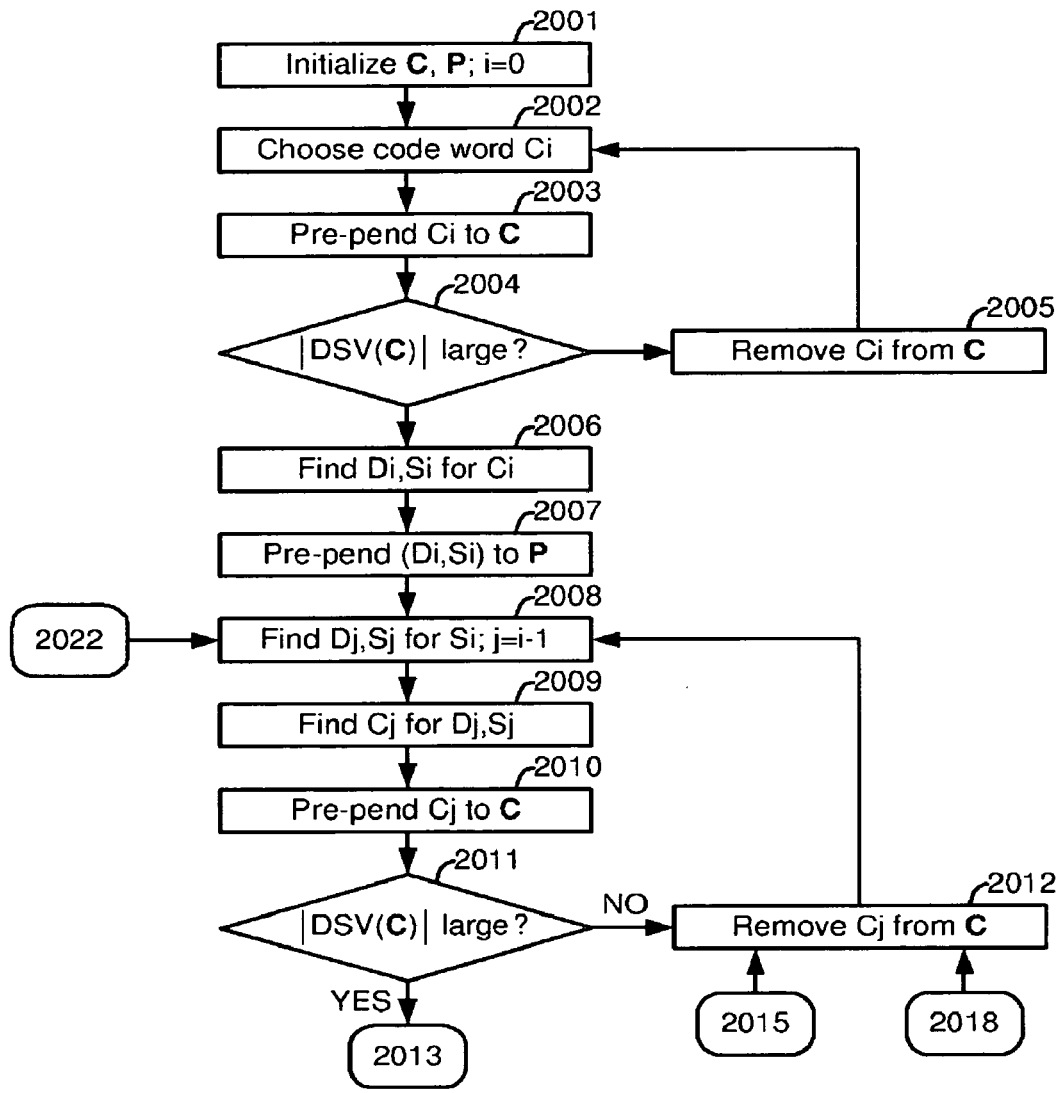
FIGS. 20a and 20b illustrate a flow diagram of a method of selecting data symbols for incorporation within user data to be encoded using a multimodal code.
Figure 20B:
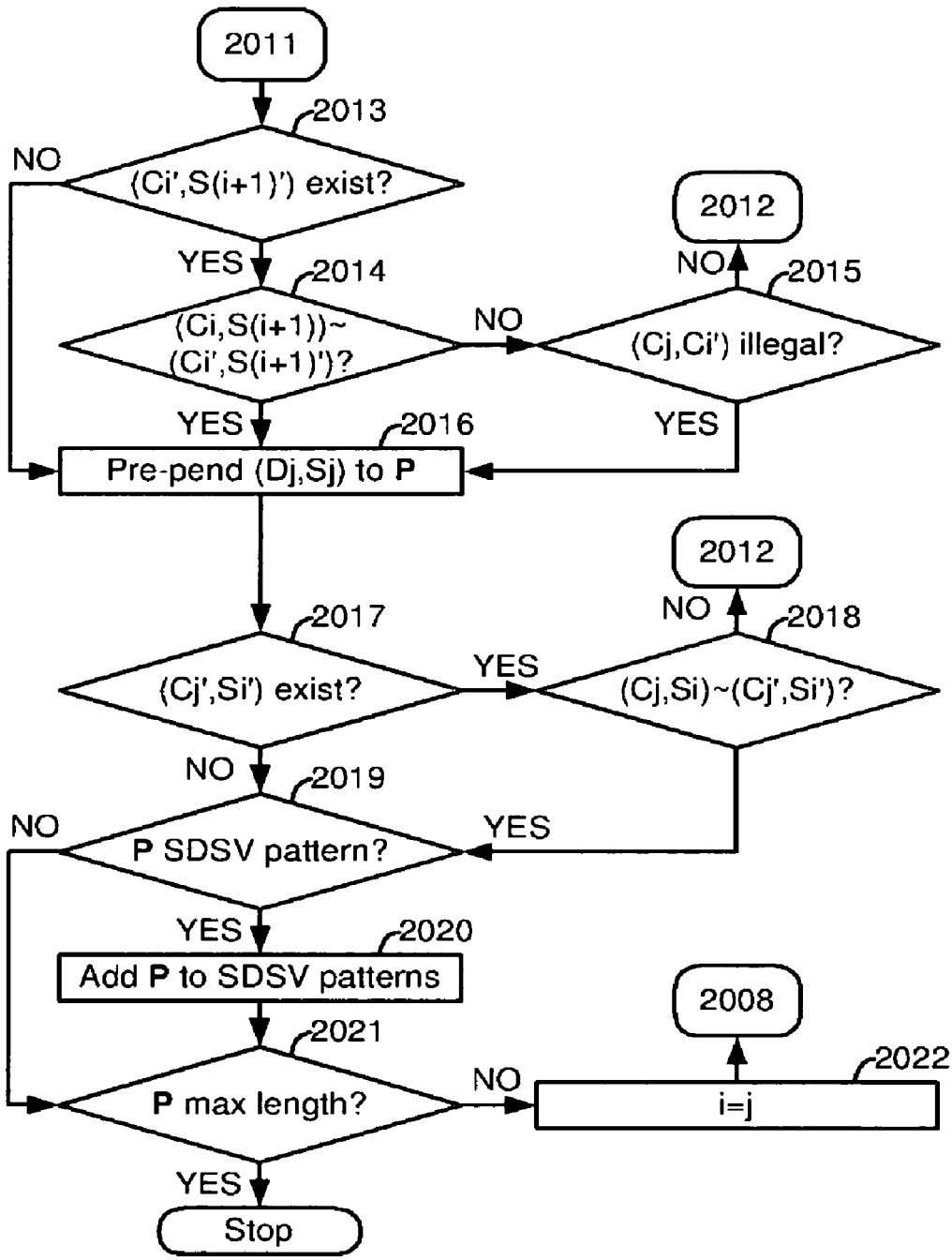

FIG. 19 illustrates the present situation. Observe that, again $D_{-2}$ is in the range $88, \ldots, 255$ and $S_{-2}=$State 2 and hence there are no alternative code words $C_{-2}'$ to consider.

The sequence of data symbols $\{D_{-2}, D_{-1}, D_0\}$ with initial state $S_{-2}=$State 2 is a SDSV pattern. Indeed, all the conditions for the definition of a SDSV pattern are satisfied as:
  a) Transitions$(C_{-2}, C_{-1}, C_0)=10$;
  b) NextState$(D_{-2}, D_{-1}, D_0)=$State $2=S_{-2}$;
  c) $|DSV(C_{-2}, C_{-1}, C_0)|$ is large;
  d) no alternative encoded sequences exist.

It follows that the pattern $(D_{-2}, D_{-1}, D_0)$ can be repeated "effectively" (from a $|DSV|$ point of view) as many times as required, provided that the initial state is State 2. More precisely, the sequence of data symbols $\{D_{-2}, D_{-1}, D_0, D_{-2}, D_{-1}, D_0, D_{-2}, D_{-1}, D_0, D_{-2}, \ldots\}$ will force any ESM encoder to output a sequence of code words whose $|DSV|$ is equal to $4*n$ when n is the length of the sequence.

SDSV Patterns

Once a number of SDSV patterns have been found, a table can be drawn listing the patterns and their characteristics, such as initial state, DSV value, as shown below.

| Pattern | Initial state | DSV | \|DSV\| per symbol |
|---|---|---|---|
| $\{A_0, A_1\}$ | $S_0$ | +8 | 4 |
| $\{B_0, B_1\}$ | $R_0$ | −8 | 4 |
| $\{C_0, C_1, C_2\}$ | $S_0$ | +12 | 4 |
| $\{D_0, D_1, D_2\}$ | $R_0$ | −12 | 4 |
| ... | ... | ... | ... |

Given these data in the table, it is possible to select suitable patterns and combine them together to form longer SDSV patterns. This is also useful to generate SDSV sequences as random-looking as possible. For example, in the table above, the first and third patterns have same initial state and, hence, the same next state, by definition of SDSV pattern. Therefore it is possible to construct the SDSV pattern $\{A_0, A_1, C_0, C_1, C_2\}$ having initial state $S_0$ and DSV=20.

What is claimed is:

1. A computer implemented method of selecting data symbols for incorporation within user data to be encoded by an encoder using a multimodal code employing one or more multimodal conversion tables stored in a memory of a computer so as to force the encoder to produce at least one subversive sequence of code words, the method comprising:
  (a) selecting a first code word from the one or more multimodal conversion tables by accessing the one or more multimodal conversion tables in the memory, which has a digital sum value (DSV) whose absolute value is large enough to cause data reading errors;
  (b) determining a first data symbol and first state which when encoded may result in the first code word according to the one or more multimodal conversion tables as determined by accessing the one or more multimodal conversion tables in the memory;
  (c) determining a second data symbol and second state compatible with the first state according to the one or more multimodal conversion tables as determined by accessing the one or more multimodal conversion tables in the memory, determining a second code word which may result by encoding the second data symbol and second state according to the one or more multimodal conversion tables as determined by accessing the one or more multimodal conversion tables in the memory, and pre-pending the second code word to the first code word to form a sequence of code words;
  (d) pre-pending the second data symbol to the first data symbol to form a sequence of data symbols when an absolute DSV of the sequence of code words is large enough to cause reading errors and also when one of the following conditions applies according to the one or more multimodal conversion tables as determined by accessing the one or more multimodal conversion tables in the memory: there is no alternative first code word which may result by encoding the first data symbol and first state, there is an alternative first code word which may result by encoding the first data symbol and first state but the first code word and a first prior state associated with the first code word are equivalent to the alternative first code word and a first alternative prior state associated with the alternative first code word, or the second code word pre-pended to the alternative first code word is ruled out by run length limiting (RLL) rules; otherwise, removing the second code word from the sequence of code words, determining an alternative first data symbol and first state which when encoded may result in the first code word, and repeating (c) and (d) for the alternative first data symbol.

2. The method according to claim 1, wherein the first code word and a first prior state associated with the first code word are determined to be equivalent to the alternative first code word and a first alternative prior state associated with the alternative first code word by the following conditions being met: a product of a DSV for the first code word and a DSV for the alternative first code word is greater than or equal to zero; transitions of the first code word and transitions of the alternative first code word have a same parity; the first prior state is equal to the first alternative prior state; and the absolute DSV of the first code word is within a selected value of the absolute DSV of the alternative first code word.

3. The method according to claim 1, further comprising:
(e) determining whether the sequence of data symbols is a subversive sequence when one of the following conditions is met according to the one or more multimodal conversion tables as determined by accessing the one or more multimodal conversion tables in the memory: encoding of the first data symbol and first state may not result in an alternative second code word and alternative second state; or when encoding of the first data symbol and first state may result in an alternative second code word and alternative second state but the second code word and first state are equivalent to the alternative second code word and an alternative first state associated with the alternative second code word; otherwise, removing the second code word from the sequence of code words, determining an alternative first data symbol and first state which when encoded may result in the first code word, and repeating (c) and (d) for the alternative first data symbol.

4. The method according to claim 3, wherein the sequence of data symbols is determined to be a subversive sequence by looking at the corresponding sequence of code words and determining when at least the following conditions are met according to the one or more multimodal conversion tables as determined by accessing the one or more multimodal conversion tables in the memory: a number of transitions of the sequence of code words is even; and a next state for the sequence of data symbols is the first state.

5. The method according to claim 3, further comprising:
(f) adding the sequence of data symbols to a list of subversive sequence data patterns when the sequence of data symbols is determined to be a subversive sequence; otherwise, determining a third data symbol and third state compatible with the second state according to the one or more multimodal conversion tables as determined by accessing the one or more multimodal conversion tables in the memory and processing the third data symbol and third state in the same fashion as the second data symbol and second state unless the sequence of data symbols has reached a maximum limit, in which case the method stops processing for the first code word.

6. A method of selecting data symbols for incorporation within user data to be encoded by an encoder using a multimodal code employing one or more multimodal conversion tables stored in a memory of a computer so as to force the encoder to produce at least one subversive sequence of code words, the method comprising:
(a) selecting a first code word from the one or more multimodal conversion tables by accessing the one or more multimodal conversion tables in the memory, which has a digital sum value (DSV) whose absolute value is large enough to cause data reading errors;
(b) determining a first data symbol and first state which when encoded may result in the first code word according to the one or more multimodal conversion tables as determined by accessing the one or more multimodal conversion tables in the memory;
(c) systematically proceeding backward through the one or more multimodal conversion tables starting with the first data symbol and first state to generate a sequence of data symbols which when encoded forces the encoder to produce the at least one subversive sequence of code words; and
(d) repeating (a) through (c) to generate a list of subversive digital sum value (SDSV) sequences.

* * * * *